United States Patent
Dopp et al.

(10) Patent No.: US 8,377,149 B2
(45) Date of Patent: Feb. 19, 2013

(54) PROCESS FOR MAKING A CATALYTIC ELECTRODE AND ELECTROCHEMICAL CELL USING THE ELECTRODE

(75) Inventors: Robert Brian Dopp, Marietta, GA (US); Gary A Laisy, Olmsted Falls, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 288 days.

(21) Appl. No.: 12/967,561

(22) Filed: Dec. 14, 2010

(65) Prior Publication Data

US 2011/0083320 A1  Apr. 14, 2011

Related U.S. Application Data

(63) Continuation of application No. 11/964,065, filed on Dec. 26, 2007, now abandoned.

(60) Provisional application No. 60/877,251, filed on Dec. 27, 2007.

(51) Int. Cl.
  *H01G 9/00* (2006.01)
(52) U.S. Cl. ................................................ 29/25.03
(58) Field of Classification Search .................. None
  See application file for complete search history.

(56) References Cited

U.S. PATENT DOCUMENTS

| | | | |
|---|---|---|---|
| 3,948,684 A | 4/1976 | Armstrong |
| 4,299,646 A | 11/1981 | Sauer et al. |
| 4,877,694 A | 10/1989 | Solomon et al. |
| 4,894,296 A | 1/1990 | Borbely et al. |
| 4,902,423 A | 2/1990 | Bacino |
| 5,242,565 A | 9/1993 | Winsel |
| 5,308,711 A | 5/1994 | Passaniti et al. |
| 5,370,836 A | 12/1994 | Yokoyama et al. |
| 5,378,562 A | 1/1995 | Passaniti et al. |
| 5,447,809 A | 9/1995 | Hafner et al. |
| 5,567,538 A | 10/1996 | Oltman et al. |
| 5,587,259 A | 12/1996 | Dopp et al. |
| 5,707,499 A | 1/1998 | Joshi et al. |
| 5,814,419 A | 9/1998 | Kenyon et al. |
| 6,060,196 A | 5/2000 | Gordon et al. |
| 6,103,393 A | 8/2000 | Kodas et al. |
| 6,248,476 B1 | 6/2001 | Sun et al. |
| 6,277,169 B1 | 8/2001 | Hampden-Smith et al. |

(Continued)

FOREIGN PATENT DOCUMENTS

| | | |
|---|---|---|
| JP | 030210762 A | 9/1991 |
| JP | 07-130405 A | 5/1995 |

(Continued)

OTHER PUBLICATIONS

Patent Cooperation Treaty (PCT), International Search Report and Written Opinion for Application No. PCT/US2007/026332, filed Dec. 26, 2007, mailed May 28, 2008, European Patent Office, Netherlands.

*Primary Examiner* — Seahvosh Nikmanesh
(74) *Attorney, Agent, or Firm* — Russell H. Toye, Jr.

(57) ABSTRACT

A process for making a catalytic electrode, a process for making an electrochemical cell with a catalytic electrode, and an electrochemical cell made according to the process. The catalytic electrode has an active layer comprising a catalytic material, an electrically conductive material and a binder, and a gas diffusion layer including a material that is permeable to gas entering or escaping from the cell but essentially impermeable to electrolyte. The gas diffusion layer is adhered to the active layer by a patterned pressure bonding process to provide the catalytic electrode in which the entire gas diffusion area is adhered to the active layer, with areas of relatively high and relatively low adhesion. The electrode has a high overall bond strength, and the permeability of the gas diffusion layer remains high it has been adhered to the active layer to provide excellent high power capability.

18 Claims, 4 Drawing Sheets

U.S. PATENT DOCUMENTS

| | | |
|---|---|---|
| 6,338,809 B1 | 1/2002 | Hampden-Smith et al. |
| 6,342,317 B1 | 1/2002 | Patel et al. |
| 6,461,761 B1 | 10/2002 | Moy et al. |
| 6,555,226 B1 | 4/2003 | Kulzick et al. |
| 6,558,828 B1 | 5/2003 | Guo |
| 6,602,629 B1 | 8/2003 | Guo et al. |
| 6,753,108 B1 | 6/2004 | Hampden-Smith et al. |
| 6,911,278 B2 | 6/2005 | Hiroshima et al. |
| 6,960,409 B2 | 11/2005 | Qu |
| 7,001,689 B2 | 2/2006 | Buckle |
| 7,001,865 B2 | 2/2006 | Tada et al. |
| 7,087,341 B2 | 8/2006 | Hampden-Smith et al. |
| 7,147,967 B1 | 12/2006 | Read |
| 7,294,603 B2 | 11/2007 | Katori et al. |
| 2002/0074174 A1 | 6/2002 | Dettling et al. |
| 2003/0104936 A1 | 6/2003 | Mao et al. |
| 2003/0146414 A1 | 8/2003 | Ndzebet |
| 2003/0228522 A1 | 12/2003 | Yang et al. |
| 2004/0247988 A1 | 12/2004 | Ovshinsky et al. |
| 2006/0105159 A1 | 5/2006 | O'Hara et al. |
| 2006/0226564 A1 | 10/2006 | Carpenter |
| 2006/0269823 A1 | 11/2006 | Carpenter |
| 2006/0275648 A1 | 12/2006 | Kim et al. |
| 2007/0092784 A1 | 4/2007 | Dopp et al. |
| 2008/0102360 A1 | 5/2008 | Stimits et al. |
| 2008/0155813 A1 | 7/2008 | Dopp et al. |

FOREIGN PATENT DOCUMENTS

| | | |
|---|---|---|
| JP | 09-274936 A | 10/1997 |
| JP | 2998564 B | 1/2000 |
| JP | 20060228450 A | 8/2006 |
| JP | 20060252797 A | 9/2006 |
| JP | 20060344441 A | 12/2006 |
| KR | 20050072904 A | 7/2005 |
| KR | 20050097231 A | 10/2005 |
| WO | 0036676 A1 | 6/2000 |
| WO | 0036677 A1 | 6/2000 |

US 8,377,149 B2

PROCESS FOR MAKING A CATALYTIC ELECTRODE AND ELECTROCHEMICAL CELL USING THE ELECTRODE

CROSS-REFERENCE TO RELATED APPLICATIONS

This application is a continuation of U.S. patent application Ser. No. 11/964,065, filed Dec. 26, 2007, entitled Process for Making a Catalytic Electrode and Electrochemical Cell Using the Electrode, currently pending, which claims the benefit of U.S. Provisional Application No. 60/877,251, filed Dec. 27, 2006.

BACKGROUND

This invention relates to a catalytic electrode, particularly an electrode with a nano-catalytic material, an electrochemical cell containing the catalytic electrode, and processes for making the catalytic electrode and the electrochemical cell.

There is a wide variety of electrochemical cells that have catalytic electrodes. Examples include, but are not limited to, fuel cells, metal-air battery cells, gas (e.g., hydrogen) generating cells, and electrochemical sensor cells. Examples of such cells are found in U.S. Pat. Nos. 5,242,565; 5,308,711; 5,378,562; 5,567,538; 5,707,499; 6,060,196; 6,461,761; 6,602,629; 6,911,278; 7,001,689 and 7,001,865; and in International Patent Publication No. WO 00/36677.

An advantage of cells with catalytic electrodes is that they can use one or more active materials that are not contained within cell or battery housings, thereby providing long use time (e.g., discharge capacity) with a cell having a minimum volume. There is an ongoing desire to improve the performance of such electrochemical cells, such as by improving electrical characteristics (e.g., operating voltage, power output, energy density, discharge capacity, charging efficiency, cycle life and fade), storage characteristics, leakage resistance, cost, environmental impact of waste disposal, and safety in manufacturing.

One way to improve the electrical characteristics is through the use of a catalytic material having greater catalytic activity. One approach to doing so has been to use nano-catalysts (catalyst materials with particles smaller than one micrometer ($\mu$m) because their large surface area provides more reactive sites. To provide good electrical conductivity and low internal resistance within the catalytic electrode and to provide a large reactive surface area with the electrode, the catalytic material is often combined with a porous material with excellent electrical conductivity. Examples of such efforts can be found in U.S. Pat. No. 7,087,341; U.S. Patent Publication No. 2006/0226564; U.S. Patent Publication No. 2006/0269823; U.S. Patent Publication No. 2007/0092784; U.S. patent application Ser. No. 11/482,290, filed Jul. 7, 2006; and Unexamined Japanese Patent Publication No. 2006-252,797.

Because of the high reactivity of nano-catalyst materials, it may be necessary to process the nano-catalyst material in an inert environment, such as an Argon atmosphere. This places restrictions on and adds cost to the manufacturing process that can be undesirable, especially for large scale, high speed manufacturing. Previous efforts to control the reactivity of nano-particulate catalyst compositions include processes in which the substrate particles (e.g., an activated carbon) and nano-catalyst particles (e.g., a nano-metal) are treated in a liquid medium (e.g., a lower alcohol such as methanol), and the nano-particles are oxidized by removing the liquid medium and contacting the nano-particles with an oxidant.

Previous efforts have not been completely successful in producing catalytic electrodes and electrochemical cells using catalytic electrodes that have improved performance characteristics and are easy, economical and safe to manufacture.

SUMMARY

Some disclosed embodiments provide a process for manufacturing a catalytic electrode and/or an electrochemical cell using the catalytic electrode in an easy, economical and safe manner. Some embodiments eliminate the need for mixing in an inert atmosphere the components of the catalytic material or the resultant catalytic composition used to make the active layer of the electrode. Some embodiments eliminate the use of liquids that are highly volatile, flammable and/or explosive, that may pose potential health risks to workers, or that may pose a risk to the environment.

Some embodiments provide a catalytic electrode with a nano-catalyst material that has improved electrical properties and that will work well in an electrochemical cell when operated at high power.

Some embodiments provide an electrochemical cell that has good leakage resistance and improved performance (e.g., greater energy density, improved discharge capacity, and higher power on discharge) than cells made according to the prior art and is also stable during periods of storage and non-use.

Disadvantages of the prior art are overcome through the use of the materials and processes described below for mixing components of a catalytic material including nano-catalyst particles, forming a catalytic electrode from the catalytic material, and assembling the electrode into an electrochemical cell.

Accordingly, one aspect of the invention is an electrochemical cell comprising a catalytic electrode, a counter electrode, a separator between the catalytic and counter electrodes, and an electrolyte, all disposed within a housing having at least one opening for allowing a gas to enter into or escape from the housing; wherein: (a) the catalytic electrode has a multilayer structure comprising an active layer and a gas diffusion layer; (b) the active layer comprises a catalytic material for oxidizing or reducing an active material, an electrically conductive material, and a binder; (c) the gas diffusion layer comprises a material that is permeable to the gas entering or escaping the housing and is essentially impermeable to the electrolyte to seal the electrolyte within the housing; and (d) the gas diffusion layer has a surface with a gas diffusion area for diffusion of the gas therethrough, the entire gas diffusion area is adhered to the active layer, and adhesion of the gas diffusion area to the active layer has areas of relatively high adhesion and areas of relatively low adhesion.

Another aspect of the invention is an electrochemical cell comprising a catalytic electrode, a counter electrode, a separator between the catalytic and counter electrodes, and an aqueous alkaline electrolyte, all disposed within a housing having at least one opening for allowing oxygen to enter the housing; wherein: (a) the catalytic electrode has a multilayer structure comprising an active layer, a gas diffusion layer and a current collector; (b) the active layer comprises a catalytic material, an electrically conductive carbon and a binder; (c) the gas diffusion layer comprises a polytetrafluoroethylene material that is permeable to the oxygen entering the housing and is essentially impermeable to the electrolyte to seal the electrolyte within the housing; (d) the gas diffusion layer has a surface with a gas diffusion area for diffusion of the oxygen therethrough to the active layer, the entire gas diffusion area is adhered to the active layer, and adhesion of the gas diffusion area to the active layer has areas of relatively high adhesion and areas of relatively low adhesion; (e) the catalytic electrode has sufficient permeability to be capable of providing 220 mW/cm$^2$ to 700 mW/cm$^2$ maximum power on a Half Cell AC Impedance/Potential Dynamic Scan test; (f) the current collector comprises an expanded metal comprising nickel, coated with graphite; and (g) the cell contains no added mercury.

Yet another aspect of the invention is a process for making a catalytic electrode for an electrochemical cell, comprising the steps: (a) mixing a catalytic material for oxidizing or reducing an active material with an electrically conductive material and a binder; (b) forming the mixture from step (a) into an active layer sheet; (c) disposing a first surface of a gas diffusion layer sheet against a first surface of the active layer sheet; (d) applying pressure to a second surface of the active layer sheet and a second surface of the gas diffusion layer sheet to bond the gas diffusion layer sheet to the active layer sheet to produce a gas diffusion area is bonded to the active layer with areas of relatively high adhesion and relatively low adhesion between the gas diffusion layer and active layer; and (e) forming the bonded layers into an electrode having adhesion between essentially the entire adjacent second surfaces of the bonded layers.

These and other features, advantages and objects of the present invention will be further understood and appreciated by those skilled in the art by reference to the following specification, claims and appended drawings.

Unless otherwise specified, the following definitions and methods are used herein:

1. Anode means the negative electrode of an electrochemical cell.
2. Cathode means the positive electrode of an electrochemical cell.

Unless otherwise specified herein, all disclosed characteristics and ranges are as determined at room temperature (20-25° C.).

DESCRIPTION

Electrochemical cells according to the invention can be metal-air, hydrogen generating or oxygen generating cells, for example. The invention is exemplified by metal-air battery cells as described below. Metal-air battery cells can be made in a variety of shapes and sizes, including button cells, cylindrical cells and prismatic cells.

Figure 1:
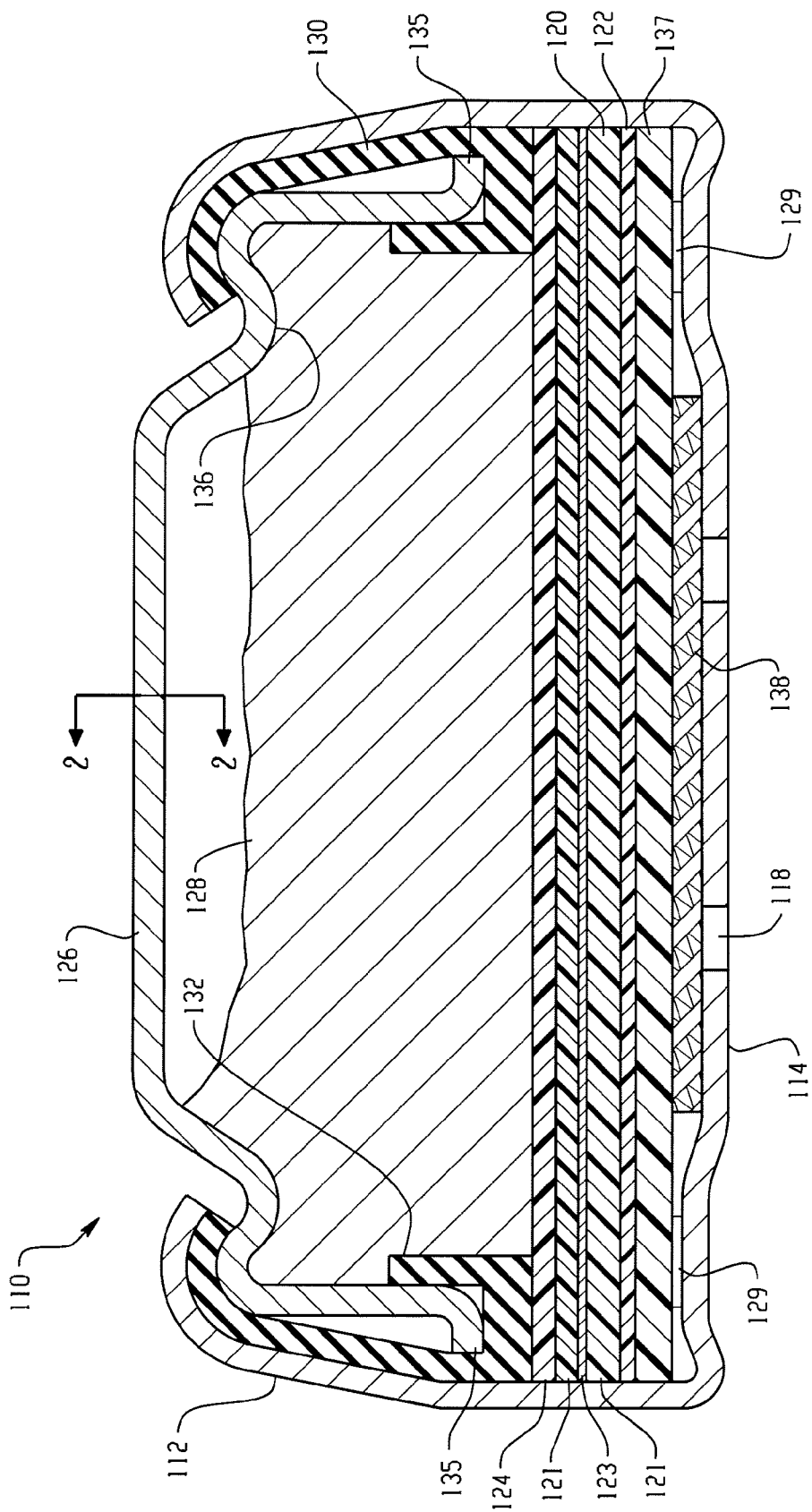
FIG. 1 is an elevational view, in cross-section, of a prismatic shaped metal-air cell with a catalytic electrode.
Figure 3:
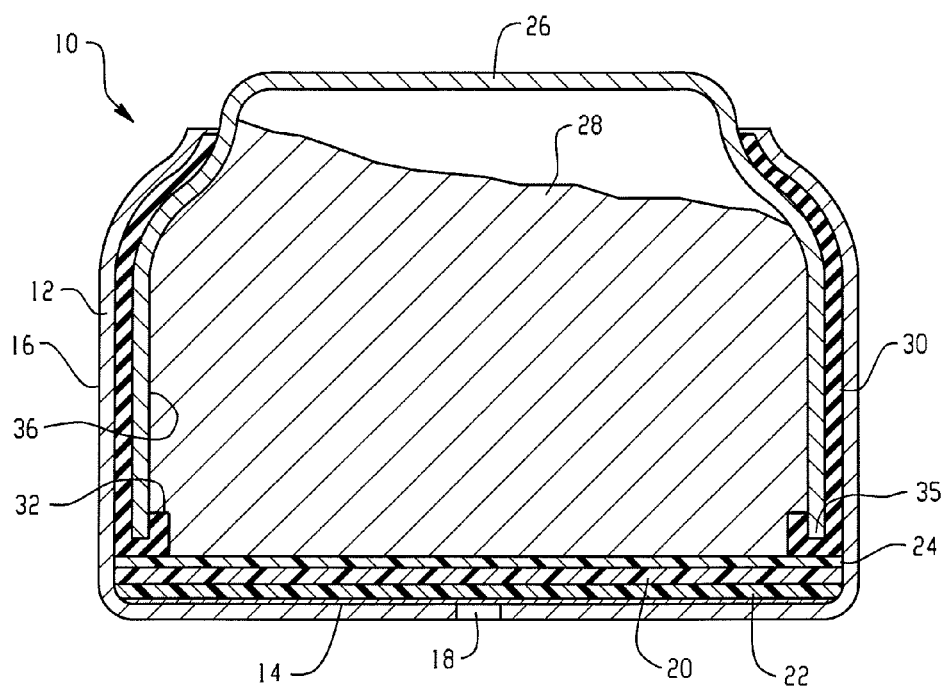
FIG. 3 is an elevational view, in cross-section, of a button shaped metal-air cell with a catalytic electrode.

Examples of prismatic and button metal-air cells are shown in FIGS. 1 and 3, respectively. An embodiment of a button cell 10 including an anode casing 26 that is generally a cup-shaped metal component is illustrated in FIG. 3. Cell 10 is an air cell that includes a cathode casing 12 that is cup-shaped, and is preferably formed of nickel-plated steel such that it has a relatively flat central region 14 which is continuous with and surrounded by an upstanding wall 16 of uniform height. Alternatively, in one embodiment the central region 14 of the can bottom may protrude outward from the peripheral part of the can bottom. At least one hole 18 is present in the bottom of cathode can 12 to act as an air entry port. The casings 12, 26 can include single or multiple steps if desired.

An embodiment of a prismatic cell 110 including an anode casing 126 of the present invention is shown in FIG. 1. The cell 110 illustrated is an air cell that includes cathode casing 112, preferably formed of nickel-plated steel. Anode casing 126 and cathode casing 112 are generally prismatic-shaped, and preferably rectangular, with each casing 126, 112 defining four linear or nonlinear sidewalls connected to a base or central region, preferably planar. Alternatively, cathode casing 112 can have a base with an area that protrudes outward from the peripheral part of the casing base. At least one hole 118 is present in the bottom of cathode can 112 to act as an air entry port. The casings 112, 126, can include single or multiple steps if desired.

Figure 2:
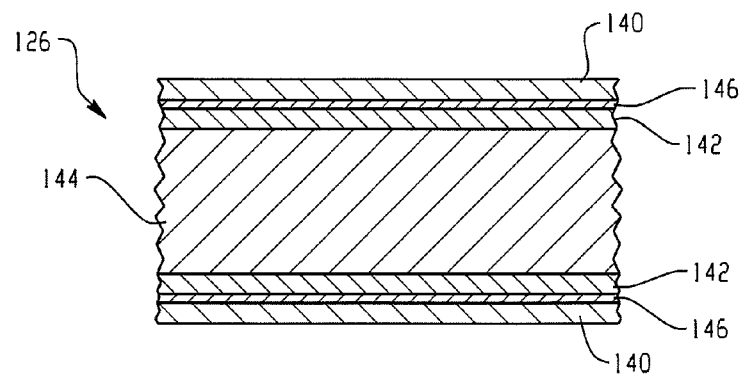
FIG. 2 is an enlarged cross-sectional view through the material construction of the anode casing at line 2-2 of FIG. 1, illustrating one embodiment of the anode casing material.

Referring to FIGS. 1 and 3, a catalytic positive electrode, such as air electrode 20, 120 is disposed near the bottom of the cathode casing 12, 112. As shown in greater detail in FIG. 1, the air electrode 120 can include a catalytic layer containing a mixture of carbon, a nano-catalyst, and a binder. Air electrode 20, 120 also preferably has a hydrophobic layer 22, 122, such as a hydrophobic membrane or film, laminated thereon. The hydrophobic layer 22, 122 is laminated on the side of the air electrode closest to the bottom of the cell when oriented as shown in FIGS. 1 and 2. Air electrode 20, 120 also preferably contains an electrically conductive current collector 123 (FIG. 1), typically a metal screen or expanded metal, such as nickel or a nickel plated or clad iron or steel, embedded therein, preferably on the side of the electrode opposite the hydrophobic layer 22, 122. The air electrode may also optionally contain a barrier membrane 137, such as a PTFE film, between the laminated hydrophobic layer 22, 122 and flat central region 14, 114 of the bottom of the casing 12, 112.

In a preferred embodiment, the catalytic layer 121 contains a catalytic composition that includes composite particles comprising nano-catalyst particles adhered to (e.g., adsorbed onto) the external and internal surfaces (including surfaces of open pores) of highly porous carbon substrate particles.

The carbon material can be an activated carbon, preferably steam activated carbon, and more preferably steam activated carbon derived from coal. An activated carbon is a carbon with a specific surface area (BET method) of at least about 500 m$^2$/g, with 1500 m$^2$ being achievable. Examples of steam activated carbons are Type PWA carbon (Calgon Carbon Corp., Pittsburgh, Pa., USA) and NORIT® Supra carbon, NORIT® Super carbon and DARCO® G-60 carbon (all from American Norit Co., Inc., Marshall, Tex., USA), with DARCO® G-60 carbon being a preferred steam activated carbon. Typical properties of DARCO® G-60 carbon include: carbon particles pass through a No. 100 sieve but do not pass through a No. 325 sieve (US Standard Series sieves per ASTM E-11); a particle size distribution with a d$_{50}$ of about 34 µm, a $d_5$ of about 5.5 µm and a $d_{95}$ of about 125 µm; a specific surface area (BET method) from about 600 to about 1000 m$^2$/g; a pore volume of about 0.95 ml/g, dry basis; a bulk density (tamped) of about 0.40 g/ml; and an iron content of the carbon no greater than 200 parts per million (ppm).

The nano-catalyst can be a metal, metal alloy or metal oxide with particles of sub-micron size, at least one and preferably all of the metals of which can be selected from the transition metals (metals having incomplete d subshells) of groups 3-12, the metals of groups 13-16, the lanthanides, mixtures, combinations and/or alloys thereof. Preferred metals include manganese, nickel, cobalt and silver, with manganese being especially preferred. The nano-catalysts have primary particles with a maximum dimension of from about 1 nm to about 999 nm (0.999 µm), referred to herein as nano-particles. As used herein, primary particles are particles that are bound together chemically rather than physically (e.g., by electrostatic charge, van der Waals forces or moisture). Primary particles can form agglomerates of primary particles that are held together physically. Preferably the majority of the nano-catalyst particles are generally spherical with maximum dimensions of less than 50 nm, more preferably less than 20 nm, and most preferably less than 10 nm. The nano-catalyst can include oxidized nano-particles. The oxidized nano-particles can be fully or partially oxidized metal. A partially oxidized nano-particle can have a metal core with an oxide shell. The oxide shell is preferably an essentially complete shell, covering essentially the entire external surface of the particle. Preferably at least the majority of the primary nano-particles have at least an oxide shell (i.e., they are oxidized on at least their exterior surfaces) to minimize agglomeration of the primary particles and facilitate uniform mixing. More preferably at least 80 percent, and even more preferably at least 90 percent, of the primary nano-particles have at least an oxide shell. Most preferably no more than 5 percent of the nano-particles do not have at least an oxide shell. Nano-catalysts including oxidized nano-particles are available from QuantumSphere, Inc. (QSI), Santa Ana, Calif., USA.

A preferred nano-catalyst is a nano-manganese such as QSI-NANO® Manganese/Manganese Dioxide Powder, as disclosed in U.S. patent application Ser. No. 11/482,290, filed Jul. 6, 2006. In one embodiment, the nano-manganese can include a mixture of phases, such as metallic manganese and one or more oxides of manganese, such as MnO, $Mn_2O_3$, and $Mn_3O_4$. The overall composition of the nano-manganese can be $MnO_x$ where x is from about 0.5 to about 2.0, preferably from about 0.7 to about 1.3, and more preferably from about 0.9 to about 1.1. The primary oxidized particles are generally sphere-like in shape, typically with a maximum dimension of about 20-30 nm in size, with some smaller particles, down to 10 nm or less. The primary metallic manganese particles are generally rod-like in shape and typically about 20 nm in width and about 100 to 200 nm long. Primary particles can agglomerate to form larger clusters. It is generally desirable to minimize agglomeration or break up agglomerates to achieve the most uniform distribution of the nano-catalyst in the catalytic composition.

The catalytic composition can include a binder for binding the particles of carbon together. The binder can be a fluorocarbon material, such as polytetrafluoroethylene (PTFE). Suitable PTFE materials that can be used to make the catalytic layer composition include TEFLON® materials (available from E.I. duPont de Nemours & Co., Polymer Products Div., Wilmington, Del., USA), including powders such as TEFLON® 7C and, preferably, dispersions such as TEFLON® T30B, T30N, TE3857, TE3859 and modifications thereof. More preferably the PTFE material is T30B or a modification of TE3859 (e.g., TE3859 fluorocarbon resin plus 2 percent TRITON™ X-100 octylphenol ethoxylate nonionic surfactant (Dow Chemical Company, Midland, Mich., USA) based on the weight of the TE3859). The fluorocarbon binder can be fibrillated in the catalytic material mixing process.

In a preferred embodiment, the catalytic layer 121 of the electrode 120 contains oxidized nano-manganese and activated carbon in a ratio of from about 0.01/1 to about 0.10/1 by weight and from 1-25 weight percent PTFE binder (the minimum amount is more preferably at least 2, even more preferably at least 5 and most preferably at least 7 weight percent; the maximum amount is more preferably no greater than 15 and most preferably no greater than 12 weight percent).

The hydrophobic layer 22, 122 is hydrophobic material that has a low enough surface tension to be resistant to wetting by the electrolyte, yet porous enough to allow the required gas (e.g., oxygen in the air for a metal-air cell) to enter the electrode at a rate sufficient to support the desired cell reaction rate. Fluorocarbon membranes such as polytetrafluoroethylene (PTFE) can be used for the hydrophobic layer. A preferred PTFE material is a high permeability material with an air permeability value of from 1 to 300 seconds. A preferred PTFE material has an apparent density from about 1.5 to 1.7 g/cm$^2$. Examples of preferred materials are unsintered natural PTFE film, such as 0.10 mm (0.004 inch) thick PTFE membrane, product number N6389A (from Performance Plastics Product (3P), Houston, Tex., USA) with an air permeability value of about 100-200 seconds and an apparent density of about 1.60±0.5 g/cm$^2$; and expanded TEFLON® film, such as 0.076 mm (0.003 inch) thick expanded film sample number 12850830.1 (from W.L. Gore & Associates, Inc., Elkton, Md., USA). The air permeability value is the time required for 2.5 cm$^3$ of air under a constant pressure of 30.94 g/cm$^3$ (12.2 inches of water, or 0.44 pounds/in$^2$) to pass through an area of 0.645 cm$^2$ (0.1 in$^2$) and can be measured with a Gurley Densometer, Model 4150, for example.

At least one layer of separator 24, 124 is positioned on the side of the air electrode 20, 120 facing the anode 28, 128. The separator 24, 124 is ionically conductive and electrically non-conductive. The total thickness of the separator 24, 124 is preferably thin to minimize its volume, but must be thick enough to prevent short circuits between the anode 28, 128 and air electrode 20, 120. While there are advantages to a single layer, two (or more) layers may be needed to prevent short circuits through a single pore, hole or tear in the material. For aqueous alkaline metal-air cells, cellulosic materials such as rayon, cotton and wood fiber (e.g., paper) and combinations thereof are preferred. An example of a preferred separator is a combination of a layer of water-wettable non-woven polypropylene membrane treated with surfactant (adjacent to the anode 28, 128) and a layer of hydrophobic polypropylene membrane (adjacent to the air electrode 20,120), such as CELGARD® 5550 and CELGARD® 3501 separators, respectively, both from Celgard, Inc., Charlotte, N.C., USA. Another example of a preferred separator material is rayon bound with polyacrylic acid (e.g., FS22824AB grade separator from Carl Freudenberg K G, Weinheim, Germany, and BVA 02530 grade separator from Hollingsworth & Vose, East Walpole, Mass., USA). The separator 24, 124 is preferably adhered to the entire surface of the air electrode 20, 120 to provide the best ion transport between the electrodes and to prevent the formation of air pockets between the air electrode 20, 120 and the separator 24, 124. Similarly, adjacent layers of the separator 24, 124 are adhered to each other.

A layer of porous material 138 can be positioned between air electrode 20, 120 and the bottom of casing 12, 112 to evenly distribute air to electrode 20, 120. A sealant 129 such as a thermoplastic hot melt adhesive, for example SWIFT® 82996 (from Forbo Adhesives, LLC of Research Triangle Park, N.C., USA) can be used to bond portions of the cathode to cathode casing 112.

Cell 10, 110 also includes anode casing 26, 126 which forms the top of the cell. The anode casing 126 in FIG. 1 has a rim 135 is flared outward at its open end. The anode casing 26 in FIG. 3 has essentially straight side walls and that has a rim 35 with little or no outward flare. Alternatively, a cell can have a refold anode casing in which the rim is folded outward and back along the side wall to form a substantially U-shaped side wall with a rounded edge at the open end of the casing.

The anode casing 26, 126 can be formed from a substrate including a material having a sufficient mechanical strength for the intended use. The anode casing 26, 126 can be a single layer of material such as stainless steel, mild steel, cold rolled steel, aluminum, titanium or copper. Preferably the anode casing includes one or more additional layers of material to provide good electrical contact to the exterior surface of the anode casing 26, 126, resistance of the external surface to corrosion, and resistance to internal cell gassing where the internal surface of the anode casing 26, 126 comes in contact with the anode 28, 128 or electrolyte. Each additional layer can be a metal such as nickel, tin, copper, or indium, or a combination or alloy thereof, and layers can be of the same or different metals or alloys. Examples of plated substrates include nickel plated steel, nickel plated mild steel and nickel plated stainless steel. Examples of clad materials (i.e., laminar materials with at least one layer of metal bonded to another layer of metal) include, as listed in order from an outer layer to an inner layer, two-layered (biclad) materials such as stainless steel/copper, three-layered (triclad) materials such as nickel/stainless steel/copper and nickel/mild steel/nickel, and materials with more than three clad layers.

The anode casing 26, 126 can include a layer that is post-plated (i.e., plated after forming the anode casing into its desired shape). The post-plated layer is preferably a layer of metal with a high hydrogen overvoltage to minimize hydrogen gassing within the cell 10, 110. Examples of such metals are copper, tin, zinc, indium and alloys thereof. A preferred metal is tin, and a preferred alloy is one comprising copper, tin and zinc.

In one embodiment, illustrated in FIG. 2, the material of the anode casing 126 in FIG. 1 has a substrate having a steel layer 144 pre-plated with a layer of nickel 142 on each side, as well as a post-plated layer 140 of tin or a copper-tin-zinc alloy for example. The anode casing 126 in this embodiment can also be provided with a strike layer 146 between the substrate and the post-plated layer 140. A preferred strike layer 146 is a post-plated layer of copper which promotes adhesion between the substrate and the final post-plated layer 140.

In the embodiment shown in FIG. 3, anode casing 26 is made from a nickel-stainless steel-copper triclad material, with the copper layer on the inside, post-plated with tin or an alloy of copper, tin and zinc. The preferred composition of a layer of an alloy of copper, tin and zinc includes 50 to 70 weight percent copper, 26 to 42 weight percent tin, and 3 to 9 weight percent zinc. A strike layer of copper can be post-plated onto the anode casing 26 prior to the final post-plated layer to improve its adhesion to the triclad substrate material. The copper-tin-zinc alloy can be applied in multiple layers with the under layer(s) having a higher copper content than the surface layer, as described in detail in U.S. patent application Ser. No. 11/933,552, filed Nov. 1, 2007, which is hereby incorporated by reference.

The anode casing 26, 126 can be formed using any suitable process. An example is a stamping process. A button cell anode casing 26 is preferably formed using three or more progressively sized stamping dies, after which the casing 26 is punched out of the coil of triclad strip.

During manufacture of the cell, anode casing 26, 126 can be inverted, and then a negative electrode composition or anode mixture 28, 128 and electrolyte put into anode casing 26, 126. The anode mixture insertion can be a two step process wherein dry anode mixture materials are dispensed first into the anode casing 26 followed by KOH solution dispensing. In a prismatic cell, the wet and dry components of the anode mixture are preferably blended beforehand and then dispensed in one step into the anode casing 126. Electrolyte can creep or wick along the inner surface 36, 136 of the anode casing 26, 126, carrying with it materials contained in anode mixture 28, 128 and/or the electrolyte.

An example of an anode mixture 28, for a button cell comprises a mixture of zinc, electrolyte, and organic compounds. The anode mixture 28 preferably includes zinc powder, a binder such as SANFRESH™ DK-500 MPS, CARBOPOL® 940 or CARBOPOL® 934, and a gassing inhibitor such as indium hydroxide ($In(OH)_3$) in amounts of about 99.7 weight percent zinc, about 0.25 weight percent binder, and about 0.045 weight percent indium hydroxide. SANFRESH™ DK-500 MPS is a crosslinked sodium polyacrylate from Tomen America Inc. of New York, N.Y., and CARBOPOL® 934 and CARBOPOL® 940 are acrylic acid polymers in the 100% acid form and are available from Noveon Inc. of Cleveland, Ohio.

The electrolyte composition for a button cell can be a mixture of about 97 weight percent potassium hydroxide (KOH) solution where the potassium hydroxide solution is 28-40 weight percent, preferably 30-35 weight percent, and more preferably about 33 weight percent aqueous KOH solution, about 3.00 weight percent zinc oxide (ZnO), and a very small amount of CARBOWAX® 550, which is a polyethylene glycol based compound available from Union Carbide Corp., preferably in an amount of about 10 to 500 ppm, more preferably about 30 to 100 ppm, based on the weight of zinc composition in the anode.

An anode mixture 128, for a prismatic cell can include a mixture of zinc, electrolyte, and organic compounds. The anode mixture 128 preferably includes zinc powder, electrolyte solution, a binder such as CARBOPOL® 940, and gassing inhibitor(s) such as indium hydroxide ($In(OH)_3$) and DISPERBYK® D190 in amounts of about 60 to about 80 weight percent zinc, about 20 to about 40 weight percent electrolyte solution, about 0.25 to about 0.50 weight percent binder, about 0.045 weight percent indium hydroxide and a small amount of DISPERBYK® D190, preferably in an amount of about 10 to 500 ppm, more preferably about 100 ppm, based on the weight of zinc. DISPERBYK® D190 is an anionic polymer and is available from Byk Chemie of Wallingford, Conn.

The electrolyte composition for a prismatic cell can be a mixture of about 97 weight percent potassium hydroxide (KOH) solution where the potassium hydroxide solution is about 28 to about 40 weight percent, preferably about 30 to about 35 weight percent, and more preferably about 33 weight percent aqueous KOH solution, and about 1.00 weight percent zinc oxide (ZnO).

Preferred zinc powders are low-gassing zinc compositions suitable for use in alkaline cells with no added mercury. Examples are disclosed in U.S. Pat. Nos. 6,602,629 (Guo et al.), 5,464,709 (Getz et al.) and 5,312,476 (Uemura et al.), which are hereby incorporated by reference.

One example of a low-gassing zinc is ZCA grade 1230 zinc powder from Zinc Corporation of America, Monaca, Pa., USA, which is a zinc alloy containing about 400 to about 550 parts per million (ppm) of lead. The zinc powder preferably contains a maximum of 1.5 (more preferably a maximum of 0.5) weight percent zinc oxide (ZnO). Furthermore, the zinc powder may have certain impurities. The impurities of chromium, iron, molybdenum, arsenic, antimony, and vanadium preferably total 25 ppm maximum based on the weight of zinc. Also, the impurities of chromium, iron, molybdenum, arsenic, antimony, vanadium, cadmium, copper, nickel, tin, and aluminum preferably total no more than 68 ppm of the zinc powder composition by weight. More preferably, the zinc powder contains no more than the following amounts of iron, cadmium, copper, tin, chromium, nickel, molybdenum, arsenic, vanadium, aluminum, and germanium, based on/the weight of zinc: Fe— 3.5 ppm, Cd— 8 ppm, Cu— 8 ppm, Sn— 5 ppm, Cr— 3 ppm, Ni— 6 ppm, Mo— 0.25 ppm, As— 0.1 ppm, Sb— 0.25 ppm, V— 2 ppm, Al— 3 ppm, and Ge— 0.06 ppm.

In another embodiment, the zinc powder preferably is a zinc alloy composition containing bismuth, indium and aluminum. The zinc alloy preferably contains about 100 ppm of bismuth, 200 ppm of indium, and 100 ppm of aluminum. The zinc alloy preferably contains a low level of lead, such as about 35 ppm or less. In a preferred embodiment, the average particle size ($D_{50}$) is about 90 to about 120 microns. Examples of suitable zinc alloys include product grades NGBIA 100, NGBIA 115, and BIA available from N.V. Umicore, S.A., Brussels, Belgium.

Cell 10, 110 also includes a gasket 30, 130 made from an elastomeric material which serves as the seal. The bottom edge of the gasket 30, 130 has been formed to create an inwardly facing lip 32, 132, which abuts the rim of anode casing 26, 126. Optionally, a sealant may be applied to the sealing surface of the gasket, cathode casing and/or anode casing. Suitable sealant materials will be recognized by one skilled in the art. Examples include asphalt, either alone or with elastomeric materials or ethylene vinyl acetate, aliphatic or fatty polyamides, and thermoplastic elastomers such as polyolefins, polyamine, polyethylene, polypropylene and polyisobutene. A preferred sealant is SWIFT® 82996, described hereinabove.

The cathode casing 12, 112, including the inserted air electrode 20, 120 and associated membranes can be inverted and pressed against the anode cup/gasket assembly, which can be preassembled with the casing inverted so the rim of the casing faces upward. While inverted, the edge of the cathode casing 12, 112 can be deformed inwardly, so the rim 34, 134 of the cathode casing 12, 112 is compressed against the elastomeric gasket 30, 130, which is between the cathode casing 12, 112 and the anode casing 26, 126, thereby forming a seal and an electrical barrier between the anode casing 26, 126 and the cathode casing 12, 112.

Any suitable method may be used to deform the edge of the casing inward to seal the cell, including crimping, colleting, swaging, redrawing, and combinations thereof as appropriate. Preferably the button cell is sealed by crimping or colleting with a segmented die so that the cell can be easily removed from the die while a better seal is produced. As used herein, a segmented die is a die whose forming surfaces comprise segments that may be spread apart to enlarge the opening into/from which the cell being closed is inserted and removed. Preferably portions of the segments are joined or held together so they are not free floating, in order to prevent individual segments from moving independently and either damaging the cell or interfering with its insertion or removal. Preferred crimping mechanisms and processes are disclosed in commonly owned U.S. Pat. No. 6,256,853, which is hereby incorporated by reference. Preferably a prismatic cell is sealed by crimping.

A suitable tab (not shown) can be placed over the opening 18, 118 until the cell 10, 110 is ready for use to keep air from entering the cell 10, 110 before use.

A catalytic composition for the active layer of a catalytic electrode can be made from a catalytic mix using a nano-catalyst or precursor to provide a composite catalytic material containing at least partially oxidized nano-catalyst particles adhered to the external surfaces and the internal surfaces (the surfaces of the pores) of the carbon particles. Oxidation of the nano-catalyst particles or formation of oxidized nano-catalyst particles from a precursor can take place before or during the mixing process. The degree of oxidation can be controlled. The oxide can provide one or more functions, such as aiding the catalytic reaction, imparting stability, and/or reducing agglomeration of the nano-particles.

In a process in which the nano-catalyst is oxidized during mixing of the catalytic mix ingredients, nano-metal particles are at least partially oxidized after being adhered to carbon particles by separately mixing both the nano-metal particles with a liquid medium, preferably a deoxygenated liquid medium such as a deoxygenated lower alcohol, mixing together the nano-metal and carbon mixtures, and then partially oxidizing the nano-metal particles by bringing the nano-particles into contact with an oxidant after the nano-metal particles are adhered to the carbon particle surfaces. A binder, such as a fluorocarbon material, can be used to adhere the nano-metal particles to the carbon. The deoxygenated liquid medium can be removed prior to adding the oxidant, or an oxidant can be added before removing the liquid medium. To prevent non-controlled oxidation of the nano-metal before adding the oxidant, the mixing steps prior to addition of the oxidant can be carried out in an environment in which oxidation of the nano-metal is substantially prevented, such as in an inert gas (e.g., argon) atmosphere. Any suitable oxidant can be used, such as $O_2$, $O_3$, nitrogen oxides (e.g., $N_xO_y$, where x=1-2 and y–1-5), and halogen oxides. In some embodiments water can be used as an oxidant. Mixtures of oxidants can also be used.

The nano-catalyst can be formed from a precursor, such as by the reduction of potassium permanganate dissolved in a liquid medium, to form particles of the insoluble nano-catalyst (manganese oxide) on the internal and external surfaces of the carbon particles. In one embodiment, a catalytic composition for an active layer of an electrode can be made as follows; the quantities are representative and quantities and proportions can be varied. About 400 g to 1500 g distilled water is placed into a large beaker with a volume of about 3 times the water volume. About ⅓ the water weight of activated carbon (e.g., DARCO® G-60 from American Norit Corp. or equivalent) is added to the water. Potassium permanganate ($KMnO_4$) in an amount up to about the weight of the carbon (e.g., about ⅓ the weight of the carbon) is added to the mixture slowly while stirring, resulting in up to about 15% by weight as manganese (Mn) in the final dry catalytic composition. The $KMnO_4$ can be added as dry crystals or as a prepared solution of about 20% $KMnO_4$ in water. The above components are mixed for sufficient time (e.g., at least 20 minutes) for the activated carbon to reduce the $KMnO_4$ in situ to Mn(+2); water can be added if the mixture is too viscous to be easily stirred. From about 0.07 g to about 0.44 g of PTFE dispersion (TEFLON® 30b from E.I. DuPont de Nemours & Co., Polymer Products Division) per gram of carbon can be added while stirring the mixture to provide a dry PTFE content of from about 3 weight percent to about 25 weight percent of the total mixture; electrodes comprising up to about 50 weight percent PTFE are useful in some applications. The mixture is further mixed, e.g., for at least about 30 minutes, to insure that all of the PTFE particles to attach themselves to the carbon particles. The mixture is then filtered to remove a substantial portion of the liquid and transferred to a non-corrosive pan, preferably with a thickness of the damp mix of not more than about 5.1 cm (2 inches), dried in a preheated ventilation oven at 75° C. for at least 24 hours, then further dried in a preheated oven at 120° C. for 12 hours in an open container to produce dried Teflonated carbon. The Teflonated carbon is covered, cooled to below 100° C. and then sealed in a plastic bag. Nano-catalyst material is added to the Teflonated carbon (from about 0.01 to about 20 weight percent nano-catalyst in the resultant catalytic composition). The catalytic composition can be blended in a very high sheer blender for from about 30 seconds to about 5 minutes.

In another embodiment, a catalytic composition can be made as follows; the quantities are representative and quantities and proportions can be varied. Distilled water (500 g) is placed into a large beaker, to which activated carbon powder (e.g., 15 g of DARCO® G-60 or equivalent) is slowly added, mixing slowly to dampen the carbon. Using a mixer such as a propeller type mixer, the water and carbon are stirred sufficiently to create a stable vortex while mixing for about 20 minutes, without drawing air into the mixture (i.e., without the vortex touching the blade). Slowly (over about 30 seconds) about 250 g of 20% $KMnO_4$ solution is added to the stirring mixture, and then mixing is continued for about 30 minutes more. Very slowly (over about 1 minute), 25 cc of PTFE dispersion (TEFLON® 30b) is added while stirring, and stirring is continued for 30 minutes more, while maintaining the stable vortex and not drawing air into the mixture. When the PTFE dispersion is added, the mixture initially becomes very viscous, then less so as the PTFE particles become adhered to the carbon particles. The mixture is then filtered to remove a substantial portion of the liquid and transferred to a non-corrosive pan, dried in a preheated ventilation oven at 75° C. for 24 hours, then further dried in a preheated oven at 120° C. for 12 hours to produce dried Teflonated carbon. The Teflonated carbon is covered, cooled to below 100° C. and then sealed in a plastic bag. Nano-catalyst material is added to the Teflonated carbon (e.g., about 10 weight percent nano-catalyst in the resultant catalytic composition). The catalytic composition can be blended in a very high sheer blender for from about 30 seconds to about 5 minutes.

In yet another embodiment, a catalytic composition can be made as follows; the quantities are representative and quantities and proportions can be varied. Distilled water (about 500 g) is placed into a large beaker, and activated carbon powder (150 grams of DARCO® G-60 or equivalent) is added, mixing slowly to dampen the carbon. Using a mixer such as a propeller type mixer, the water and carbon are stirred sufficiently to create a stable vortex while mixing for about 20 minutes, without drawing air into the mixture (i.e., without the vortex touching the blade). Very slowly (over about 1 minute), 25 cc of PTFE dispersion (TEFLON® 30b) is added while stirring, and stirring is continued for 30 minutes more, while maintaining the stable vortex and not drawing air into the mixture. When the PTFE dispersion is added, the mixture initially becomes very viscous, then less so as the PTFE particles become adhered to the carbon particles. The mixture is then filtered and transferred to a non-corrosive pan, dried in a preheated ventilation oven at 110° C. for 24 hours to produce dried Teflonated carbon. The Teflonated carbon is covered, cooled to below 100° C. and sealed in a plastic bag that is stored in an inert atmosphere (e.g., in a chamber filled with nitrogen and/or argon gas). In an inert atmosphere, a nano-catalyst (preferably nano-manganese or nano-manganese alloy particles that are at least partially oxidized) are mixed with about 3 times their weight of deoxygenated methanol (MeOH) to form an ink (e.g., a black, substantially opaque liquid), the ink is optionally mixed ultrasonically, and the ink is then sealed in a vial. A mixture of 1 part of the dried Teflonated carbon and 4 parts MeOH was prepared under an inert atmosphere. Under an inert atmosphere, nano-catalyst ink is mixed with Teflonated carbon for at least 2 minutes; the quantities of ink and carbon are typically selected to provide from about 5 weight percent to about 15 weight percent nano-catalyst on a dry basis. The ink and carbon mixture is removed from the inert atmosphere after standing for about 15 minutes to allow the nano-catalyst to adsorb into the carbon particles to coat the pores (i.e., the internal surfaces of the carbon). The ink and carbon mixture is dried by placing it in a ventilated oven pre-heated to 105° C. until the mixture reaches 105° C. (e.g., for about 100 minutes for 5 g of the mixture); the nano-catalyst can be oxidized in situ (e.g., nano-manganese is oxidized to catalytically active $MnO_x$ in this drying step. The dried catalytic composition can be covered and cooled to room temperature.

A catalytic composition for the active layer of a catalytic electrode can be made, at least partially oxidizing the nano-catalyst metal in situ, according to the following steps:

1. Add distilled water to activated carbon, cover and allow the carbon to wet up.
2. Thoroughly mix the carbon and water with a high intensity, variable speed mixer, adjusting the mixer speed to produce a vortex that extends about half way to but does not reach the bottom of the container.
3. While continuing the mixing, add PTFE dispersion dropwise to the vortex, adjusting the mixer speed to maintain the desired vortex, and continue mixing until the mixer reaches about the same speed as prior to adding the PTFE dispersion.
4. Filter the water from the mixture, rinsing with distilled water.
5. Dry the remaining carbon mix at 90° C. until the mix reaches 90° C., increase the drying temperature to 105° C. and continue drying until the mix reaches 105° C., continue drying at 105° C. for several more hours, and reduce the temperature to 50° C. and continue drying until the mix reaches 50° C.; place the dry carbon mix in a sealed container while hot and allow to cool to room temperature.
6. In an argon atmosphere, mix each of the carbon mix and nano-catalyst (with or without at least partially oxidized particles) with deoxygenated methanol separately, mix the two together, add a small amount of distilled water, and mix well; cover and remove from the argon atmosphere.
7. Dry the carbon-catalyst mixture at 90° C. until the mix reaches 90° C., increase the drying temperature to 105° C. and continue drying until the mix reaches 105° C., continue drying at 105° C. for several hours more, reduce the temperature to 50° C. and continue drying until the mix reaches 50° C.; place the mix in a sealed container and allow to cool to room temperature.

The catalytic composition can also be prepared using nano-catalyst particles that have been partially oxidized before mixing with other ingredients of the catalytic composition. In some embodiments this can eliminate the need to perform mixing operations in an inert environment as well as the need to use a liquid such as deoxygenated alcohol. Accordingly, in one embodiment the liquid medium contains no more than 20 weight percent alcohol, preferably no more than 10 weight percent alcohol and more preferably no more than 5 weight percent alcohol; most preferably the liquid medium is essentially alcohol-free.

In an embodiment of the invention, the catalytic composition for the active layer of the catalytic electrode is made according to the following steps:
1. Add distilled water to activated carbon, cover and allow the carbon to wet up.
2. Thoroughly mix the carbon and water with a high intensity, variable speed mixer, adjusting the mixer speed to produce a vortex that extends about half way to but does not reach the bottom of the container.
3. While continuing the mixing, slowly add nano-catalyst (with at least partially oxidized particles); continue to mix thoroughly, adjusting the mixer speed as necessary to maintain the desired vortex.
4. Add PTFE dispersion dropwise to the vortex; continue to mix, adjusting the mixer speed as necessary to maintain the desired vortex, until the mixer reaches about the same speed as prior to adding the PTFE dispersion.
5. Filter the water from the catalytic mix, rinsing with distilled water and filter again.
6. Dry at 90° C. until the mix reaches 90° C.; increase the drying temperature to 105° C. and continue drying until the mix reaches 105° C.; continue drying at 105° C. for several more hours; reduce the temperature to 50° C. and continue drying until the mix temperature reaches 50° C.; place the mix in a sealed container and allow to cool to room temperature.

In another embodiment, larger batches of catalytic composition can be made in an air environment without dangerous solvents using commercially available mixers. Examples of mixers that can be used include an IKA® Universulmühle M20 Mix Mill (IKA North America, Wilmington, N.C., USA), and a PK® blender (Patterson-Kelly, Stroudsburg, Pa., USA). The catalytic mix can be made according to the following steps:
1. Weigh the desired quantities of nano-catalyst (with at least partially oxidized particles), activated carbon, PTFE dispersion (mix the PTFE dispersion well before weighing), and water (optional).
2. Load the activated carbon and nano-catalyst into the mixer and blend thoroughly.
3. Add the PTFE dispersion and mix thoroughly.
4. Dry the catalytic mix. This can be done in a drying mixer, such as an FM50 PLOUGHSHARE® horizontal mixer from Littleford Day, Inc. (Forence, Ky., USA) set at 381 mm (15 inches) vacuum, a plow blade speed of 180 revolutions per minute (RPM), a chopper blade speed of 3000 (RPM) cycling 20 seconds per minute and a temperature of about 74 to 85° C. (165 to 185° F.), for a total of about 94 minutes. Drying the mix in a mixer can advantageously keep the mix in constant motion and fibrillate the PTFE during drying.

In an embodiment of the invention, the catalytic mix is milled to form a sheet of catalytic material that is used as the catalytic layer of the catalytic electrode according to the following steps:
1. Mix the dried catalytic mix in a high sheer blender to fluff the mix.
2. Feed the fluffed mix between the rollers of a roller mill (preferably from the top) operating at a speed that will produce about 1.5 meters (5 feet) per minute of catalytic sheet at the desired thickness.

In an embodiment of the invention, a catalytic electrode is made according to the following steps:
1. Embed a piece of current collector into a surface of the catalytic sheet. This can be done, for example, by pressing between two flat plates or, preferably between the rollers of a roller mill. When using a roller mill, feed the current collector and catalytic sheet between the rollers (preferably horizontally, with the current collector on the bottom, to facilitate feeding), preferably with the roller mill operating at a speed of about 1.5 meters (5 feet) per minute to embed the current collector into the catalytic sheet. It is desirable to embed the current collector to a sufficient depth to provide a relatively smooth surface on the electrode in order to get the desired adhesion of the separator layer to the electrode.
2. Trim the catalytic sheet and/or current collector as desired.
3. Pressure laminate a corresponding sheet of hydrophobic film to the catalytic sheet using a roller mill, preferably on the side opposite that of the current collector. Preferably the hydrophobic film and catalytic sheet are feed into the roller mill horizontally, with the hydrophobic film on top. Optionally, the bond strength between the hydrophobic layer and the catalytic layer can be increased, such as by one or both of the following:
   a. Spray one surface of the hydrophobic film with a dilute fluorocarbon resin emulsion, such as 10 weight percent T30 PTFE dispersion in water, allow to dry, and then pressure laminate the hydrophobic film to the catalytic layer; and
   b. Pattern laminate the hydrophobic film to the catalytic layer to create areas of increased bond strength while leaving areas therebetween in which any reductions in air permeability of the hydrophobic film and the catalytic layer are minimized. Preferred methods of pattern-laminating the hydrophobic film to the catalytic layer include using a textured roller against the hydrophobic film and using a removable textured interleaf material (e.g., a woven material with high strength threads, such as silk) between the hydrophobic film and the adjacent roller. When using a textured roller, a fine pattern with very thin (e.g., 0.03 to 0.1 mm) raised portions with small areas (e.g., 0.15 to 0.25 mm across) located therebetween. An example of a suitable silk material is one having a thickness of about 0.16 mm (0.006 inch) and a thread count of about 100 per 2.54 cm (1.0 inch) in each direction, with each thread containing about 50 strands of silk.

In an embodiment of the invention, the surface of the current collector is treated to minimize the internal resistance of the electrode. A preferred current collector material, particularly for small cells such as button cells, is an expanded nickel (e.g., nickel EXMET™ from Dexmet Corp., Naugatuck, Conn., USA), preferably one with a base metal thickness from 0.05 to 0.127 and more preferably from 0.06 to 0.08 mm. The expanded nickel material is preferably equivalent to a 40 mesh (40 openings per inch) screen. Another preferred current collector material, particularly for cells larger than button cells, is a woven wire cloth with cross-bonded wires (wires welded where they cross), preferably 40 to 50 mesh (40 to 50 openings per inch) with a wire diameter of 0.10 to 0.15 mm (available from Gerard Daniel Worldwide, Fontana, Calif., USA). The surface of the current collector can be treated by acid etching, such as with nitric acid, to roughen the metal surfaces. Alternatively, the current collector can be coated with a carbon containing material, such as a graphite coating. Examples of suitable graphite coating materials include: TIMREX® LB1000, LB1016 and LB1090 aqueous graphite dispersions (TIMCAL America, Westlake, Ohio, USA), ECCOCOAT® 257 (W. R. Grace & Co.), and ELECTRODAG® 109 and 112 and EB0005 (Acheson Industries, Port Huron, Mich., USA).

In an embodiment of the invention, the density of the catalytic sheet prior to lamination of the hydrophobic sheet is about 8 to 20 mg/cm$^2$, preferably 9 to 13 mg/cm$^2$. If the density is too high, the thickness of the final electrode can be too great, and if the density is too low, the electrode may have insufficient strength.

In an embodiment of the invention, the bond strength between the hydrophobic layer and the catalytic layer of the electrode is preferably at least 65, more preferably at least 75 and most preferably at least 85 g per 25.4 mm (1 inch), as determined by a peel strength test. To maintain sufficient permeability and prevent damage to the air electrode, the bond strength is preferably no greater than 250, and more preferably no greater than 200 g per 25.4 mm (1 inch). The peel strength test measures the force required to peel the hydrophobic layer away from the air electrode and is done using a Chatillon Model TCD200 tester, fitted with 25.4 mm (1 inch) wide serrated jaw clamps. The tester is programmed with a bottom stop, at which the clamps are about 8.5 mm (⅓ inch) apart, and a top stop that allows the clamps to separate to about 50.8 mm (2 inches). The top clamp is brought to the bottom stop position and the force gauge is zeroed. A sample piece of electrode about 38.1 mm (1.5 inches) long is cut, and the hydrophobic membrane is peeled back evenly by a small amount (no more than 12.7 mm (½ inch)) from a cut edge. The exposed catalytic layer is clamped to the bottom clamp and the loose end of the hydrophobic membrane is clamped to the top clamp, with the sample centered and square. The top clamp is raised, recording the initial high gauge reading. The peel strength is calculated as the initial high gauge reading per unit width of the sample.

In an embodiment of the invention, the catalytic electrode, including the catalytic layer, current collector and hydrophobic layer, has a thickness from about 0.15 to 0.35 mm, preferably from 0.19 to 0.25 mm, and more preferably from 0.19 to 0.21 mm. If the electrode is too thick, it will occupy excessive volume within the cell. If it is too thin, it may be weak, leading to distortion or damage. Preferably the variation in thickness will be no greater than 0.03 mm and more preferably no greater than 0.015 mm. If the variation is too great, manufacturing problems such as cell assembly problems, damage, camber and scrap can result due to dimensional variation of the sheet. For cell designs such as those shown in FIGS. 1 and 3, excessive thickness variation can also contribute to increased electrolyte leakage. Areas of high and low pressure can be also be created during electrode manufacturing, leading to areas of high and low permeability of the laminated electrode and areas of high and low bond strength of the hydrophobic layer to the catalytic layer, thereby adversely affecting cell performance and resistance to leakage.

In an embodiment of the invention, one or more layers of separator are adhered to the surface of the catalytic electrode opposite the hydrophobic layer. This can be done using an adhesive applied to one or both of the adjacent surfaces of the electrode and the separator and adjacent surfaces of layers of separator. A preferred adhesive contains a polyvinyl alcohol (PVA), more preferably PVA thickened with carboxymethylcellulose (CMC) or polyacrylic acetate (PAA). Preferably the PVA adhesive contains as little PVA as possible. An example of a preferred PVA adhesive is one prepared by slowly adding about 7 weight percent PVA (e.g., PVA 52-22) to cold water while mixing with a high sheer mixer, slowly heating to 95° C. while continuing to mix, slowly adding about 1.4 weight percent CMC while continuing to mix, mixing until the solution is dissolved to clarity, sealing the solution in a sterile glass container, and allowing to cool to room temperature.

In an embodiment of the invention, a sheet of separator is adhered to the electrode and, when there is a second separator layer, a second sheet of separator is adhered to the first by painting a thin layer of adhesive on the electrode or layer of separator on the electrode and drying at 80° C., painting a thin layer of adhesive onto the sheet of separator to be adhered, applying the adhesive-painted separator sheet to the electrode or separator-laminated electrode, and drying.

In an embodiment of the invention, a sheet of separator is pressure laminated to the catalytic electrode, using, for example, a roller mill. Preferably the separator is laminated to the catalytic layer with embedded current collector before laminating the hydrophobic layer to avoid damage to the hydrophobic layer, since higher pressure may be required for separator lamination. For a 2-layer separator, the second layer is adhered to the layer adjacent the catalytic layer of the electrode using an adhesive. This can be done after pressure laminating the first separator layer to the electrode, or, preferably, the two separator layers can be laminated together with an adhesive, followed by pressure lamination of the two-layer separator to the electrode.

In an embodiment of the invention, the catalytic electrode is capable of providing a maximum power from 220 mW/cm$^2$ to 700 mW/cm$^2$ on a Half-Cell Potential Dynamic Scan test as described below. Preferably the maximum power is at least 250 mW/cm$^2$, more preferably at least 275 mW/cm$^2$.

Example 1

A conventional air electrode for an alkaline zinc-air cell was made. The electrode had a catalytic layer containing 70 weight percent carbon (Calgon PWA), 25 weight percent PTFE with surfactant (from TE30B), and 5 weight percent $MnO_x$. The catalytic layer was formed with a thickness of about 0.203 mm (0.008 inch) and a packing of about 38 percent (percentage of maximum theoretical density based on the theoretical densities of the component materials). An expanded nickel current collector (4Ni5-060 P&L 0.127 mm (0.005 inch) thick nickel EXMET™ from Dexmet), painted with an aqueous graphite dispersion (50 weight percent TIMREX® LB1016 in water)) was embedded under 684 kg (1508 pounds) force into the catalytic layer, with a final thickness of about 0.279 mm (0.011 inch). A sheet of 0.076 mm (0.003 inch) thick expanded PTFE membrane (Sample No. 12850830.1 from W.L. Gore) was pressure laminated to the surface of the catalytic layer opposite the surface into which the current collector was embedded to produce a laminated air electrode sheet.

Example 2

A nano-catalyst air electrode was made with nano-$MnO_x$ according to the following steps:

1. 300 g DARCO® G-60 carbon was placed in a 2000 ml glass container, 1000 g distilled water was added, and the container was covered and allowed to sit for one hour.

2. The mixture was mixed for about 30 minutes with an adjustable speed mixer, adjusting the speed to maintain a vortex extending about half way to the bottom of the container.

3. 55 g T30B PTFE was added dropwise while mixing, and mixing was continued for about 20 minutes, adjusting the speed to maintain the desired vortex.

4. The mixture was filtered, while rinsing with about 200 ml distilled water.

5. The remaining solids (the mix) were dried at about 85-90° C. for about 16 hours, then the temperature was increased to 105° C. and drying continued until the temperature of the mix reached 105° C.; then the mix was covered and allowed to cool to room temperature.

6. In an argon gas atmosphere, 10 grams of the mix was put into a porcelain bowl and mixed with 50 grams deoxygenated methanol.

7. In argon, 0.256 g nano-$MnO_x$ (QSI-Nano® Manganese) was mixed with 3 grams deoxygenated methanol.

8. In argon, the carbon/methanol and nano-$MnO_x$/methanol mixtures were mixed together for about 30 seconds, about 10 ml distilled water was mixed in, and the mixture covered and removed from the argon atmosphere.

9. The mix from step 8 was put at 105° C. until the mix temperature reached 105° C., then covered and allowed to cool to room temperature.

10. The mix was blended in a high sheer blender for 30 seconds and then fed between the rollers of a roller mill, set to 0 clearance and operating at a rate of 1.37 m (4.5 feet) per minute, to form a sheet of catalytic material 0.18 mm thick, with a density of 0.213 mg/cm³ and containing 2.50 weight percent nano-manganese.

11. The catalytic sheet was placed on top of a strip of current collector (3Ni3.3-05P nickel EXMET™, painted with an aqueous graphite dispersion (50 weight percent TIMREX® LB1016 in water)), and both were fed horizontally between the rolls of a roller mill, operating at a rate of 1.37 m (4.5 feet) per minute and applying 684 kg (1508 pounds) force, to embed the current collector into the catalytic sheet and form a sheet with a thickness of 0.248 mm (0.00975 inch).

12. A sheet of 0.076 mm (0.003 inch) thick expanded PTFE membrane (Sample No. 12850830.1 from W.L. Gore) was placed on top of the catalytic sheet with embedded current collector, and a sheet of 100 mesh (100 threads per inch) silk cloth was placed over the PTFE membrane. All three were fed horizontally between the rolls of a roller mill operating at a rate of 1.37 m (4.5 feet) per minute and applying 684 kg (1508 pounds) force to pressure laminate the PTFE membrane to the catalytic layer, thereby forming an air electrode stock.

Example 3

A sheet of BVA 02530 separator (Hollingsworth & Vose) was glued to the electrode sheets from each of Examples 1 and 2, on the surfaces of the air electrodes opposite the PTFE membranes, using pressure and a PVA/CMC adhesive. Sample electrodes were cut from each of the sheets and assembled into PR44 size alkaline zinc-air button cells.

Figure 4:
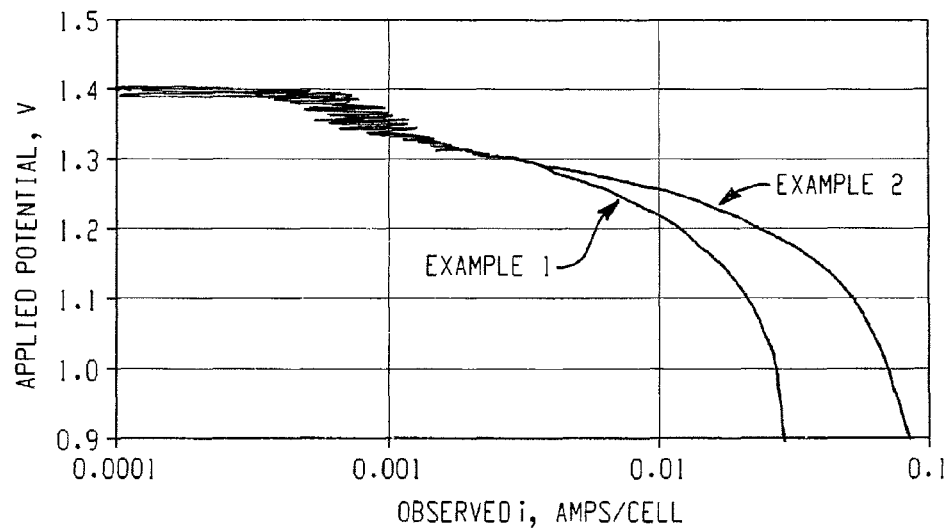
FIG. 4 is a graph showing Tafel curves, with observed current on the x-axis and applied potential on the y-axis, for a zinc-air cell with an electrode containing a conventional manganese oxide catalyst compared to a cell with an electrode containing a nano-manganese catalyst.
Figure 5:
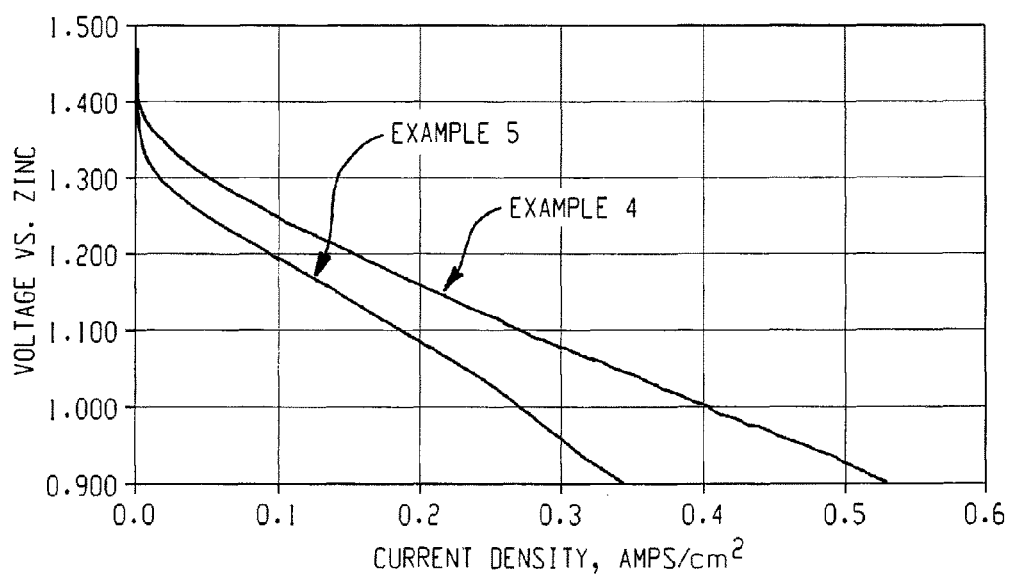
FIG. 5 is a graph showing power curves, with current density on the x-axis and voltage vs. zinc on the y-axis, for half cells with catalytic electrodes containing activated carbon, one with and one without a nano-manganese catalyst.

Cells with electrodes from each of Examples 1 and 2 were tested for open circuit voltage, followed by AC impedance, with a peak to peak potential amplitude of 10 mV, over a frequency range from 65 KHz to 0.1 Hz. This was followed by a potential dynamic scan in the cathodic direction, beginning at 0.025 V above the open circuit voltage and scanning at 1 mV/sec. to 0.7 V. This initial AC impedance and potential dynamic scan testing served to condition the catalytic electrodes. After 30 minutes open circuit, the AC impedance and potential dynamic scan tests were repeated, and these results were used. From the potential dynamic voltage scan, a voltammogram (Tafel curve) and a polarization curve were plotted. The Tafel curve is shown in FIG. 4, where the observed current (amps/cell) is on the x-axis using a log scale, and applied potential (volts) is on the y-axis. The results of the AC impedance and potential dynamic voltage scan testing are summarized in Table 1.

TABLE 1

| Parameter | Units | Example 1 | Example 2 |
|---|---|---|---|
| CCV at 4 mA | volts | 1.294 | 1.298 |
| CCV at 10 mA | volts | 1.221 | 1.255 |
| Power at 1.0 V | mW | 27.2 | 72.8 |
| Steady State R of iR | ohms | 9.52 | 5.27 |
| 10 KHz Capacitance | μF | 39.5 | 125 |
| 1 KHz Capacitance | μF | 491 | 1527 |
| 65 KHz Impedance | ohms | 0.554 | 0.510 |
| 10 KHz Impedance | ohms | 0.731 | 0.489 |
| 1 KHz Impedance | ohms | 1.310 | 0.612 |

Cells were also discharged at 100 ohms continuous. The closed circuit voltage of cells with electrodes from Example 2 was about 40 mV higher than that of cells with electrodes from Example 1.

Example 4

A nano-catalyst air electrode was made with nano-$MnO_x$ according to the following steps:

1. 200 g DARCO® G-60 carbon was placed in a 1500 ml glass container, 900 g distilled water was added, and the container was covered and allowed to sit for about 15 minutes.

2. The mixture was mixed for about 15 minutes with an adjustable speed mixer, adjusting the speed to maintain a vortex extending about half way to the bottom of the container.

3. Mixing was continued while 5.6 g nano-$MnO_x$ (QSI-Nano® Manganese) was slowly (over about 30 seconds) added to the vortex and the sides of the container were rinsed with deionized water, followed by about 15 minutes of additional mixing, adjusting the mixer speed to maintain the desired vortex.

4. Mixing was continued while 26 g of T30B PTFE was added dropwise to the vortex, followed by about 20 minutes of additional mixing, adjusting the mixer speed to maintain the desired vortex.

5. The mixture was filtered, while rinsing with about 500 ml distilled water.

6. The remaining solids (the mix) were dried at 90° C. until the mix temperature reached 90° C., the temperature was increased to 105° C. and drying continued until the temperature of the mix reached 105° C., drying at 105° C. was continued for about another 4-6 hours, and the drying temperature was reduced to 50° C.; then the mix was sealed in a container and allowed to cool to room temperature.

7. The dried mix was fluidized by blending in a high speed mixer (5 g for 30 seconds or 50 g for 5 minutes), and then fed between the rollers of a roller mill, set to 0 clearance and operating at a rate of 1.52 m (5 feet) per minute, to form a sheet of catalytic material 0.19 mm thick, with a density of 0.212 mg/cm³ and containing 2.50 weight percent nano-manganese.

8. The catalytic sheet was placed on top of a strip of current collector (3Ni3.3-05P nickel EXMET™, and both were fed horizontally between the rolls of a roller mill, operating at a rate of 1.52 m (5 feet) per minute, to embed the current collector into the catalytic sheet and form a sheet with a thickness of 0.19 mm (0.0075 inch).

9. A sheet of 0.076 mm (0.003 inch) thick expanded PTFE membrane (Sample No. 12850830.1 from W.L. Gore) was placed on top of the catalytic sheet with embedded current collector, a sheet of 100 mesh silk cloth was placed over the PTFE membrane, and all three were fed horizontally between the rolls of a roller mill operating at a rate of 1.52 m (5 feet)

per minute to pressure laminate the PTFE membrane to the catalytic layer, thereby forming an air electrode stock.

Example 5

An air electrode was made following the same steps in Example 4, except that step 3 was skipped, so no catalyst was added to the carbon mixture and only the activated carbon was present as a catalytic material.

Example 6

Electrodes from each of Examples 4 and 5 were tested in half cell fixture with a platinum counter electrode and a zinc reference electrode and flooded with 33 weight percent KOH. For each electrode the open circuit voltage was tested, followed by AC impedance, with a peak to peak potential amplitude of 10 mV, over a frequency range in the cathodic direction, beginning at 0.025 V above the open circuit voltage and scanning at 1 mV/sec. to 0.7 V vs. the reference electrode. This initial AC impedance and potential dynamic scan testing served to condition the catalytic electrodes. After 30 minutes open circuit, the AC impedance and potential dynamic scan tests were repeated, and these results were used. This test is referred to herein as the Half Cell AC Impedance/Dynamic Potential Scan Test. From the dynamic potential scan data, a polarization curve (similar to a Tafel curve, but with a linear rather than log scale for current density) was plotted. The results of the AC impedance and potential dynamic scan tests are summarized in Table 2.

TABLE 2

| Parameter | Units | Example 4 | Example 5 |
|---|---|---|---|
| CCV at 10 mA | volts | 1.363 | 1.311 |
| CCV at 100 mA | volts | 1.342 | 1.225 |
| Maximum Power | mW/cm$^2$ | 527 | 327 |
| Power at 1.0 V | mW | 400 | 273 |
| Current Density @ 1.1 V | mA/cm$^2$ | 268 | 188 |
| Current Density @ 1.0 V | mA/cm$^2$ | 400 | 273 |
| Limiting Current | mA/cm$^2$ | 652 | 523 |
| Steady State R of iR | ohms | 1.52 | 1.06 |
| 65 KHz Impedance | ohms | 0.66 | 0.60 |
| 65 KHz Capacitance | µF | 5.87 | 7.12 |
| 10 KHz Capacitance | µF | 190 | 216 |
| 1 KHz Capacitance | µF | 8393 | 8842 |

Example 7

An air electrode sheet was made with conventional MnO$_x$ catalyst as described in Example 1, except that the hydrophobic membrane was a 0.10 mm (0.004 inch) thick CD123 PTFE film from 3P, and the current collector was made from 3Ni3.3-05P nickel EXMET™. Two layers of separator (CELGARD® 3501 adjacent to the electrode sheet and CELGARD® 5550) were laminated to the surface of the electrode sheet opposite the hydrophobic layer using a PVA adhesive. Individual electrodes were cut from the sheet and assembled into PR44 size alkaline zinc-air button cells.

Example 8

An air electrode sheet was made with nano-MnO$_x$ as described in Example 2, but with a 3Ni3.3-05P nickel EXMET™ current collector. Two layers of separator were laminated to the surface of the electrode sheet as in Example 7. Individual electrodes were cut from the sheet and assembled into PR44 size alkaline zinc-air button cells.

Example 9

Figure 6:
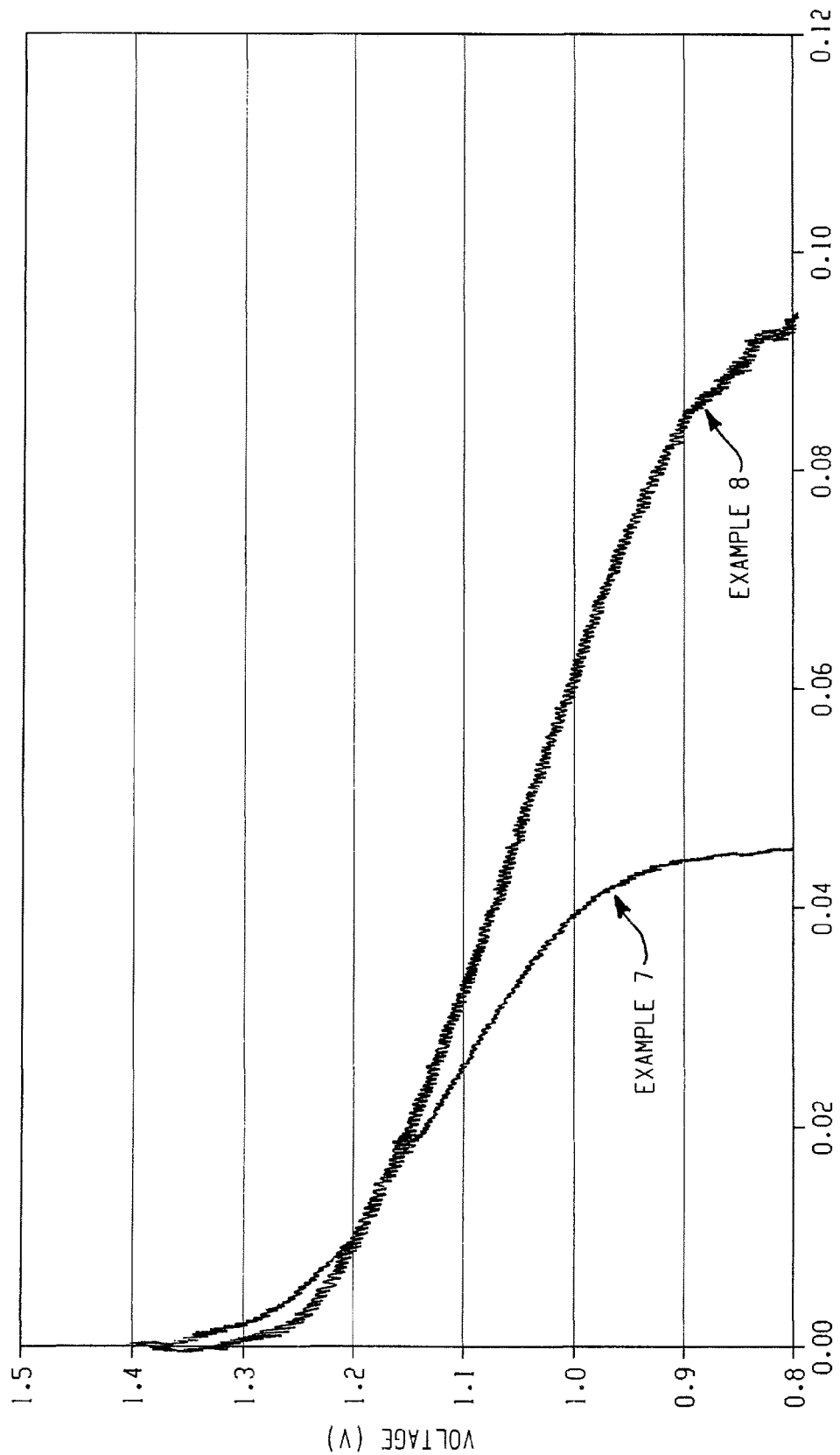
FIG. 6 is a graph showing polarization curves, with current on the x-axis and voltage on the y-axis, for a zinc-air cell with an air electrode containing a conventional manganese oxide catalyst compared to a cell with an electrode containing a nano-manganese catalyst.

Cells from each of Examples 7 and 8 were tested as described in Example 3. The polarization curve is shown in FIG. 6.

Example 10

Sheets of air electrodes made as described in Example 4 using two types of current collector materials (4Ni5-060 P&L nickel EXMET™ from Dexmet and cross-bonded 40 mesh (40 openings per inch) nickel screen with 0.15 mm (0.006 inch) diameter wires from Gerard Daniel Worldwide, Fontana, Calif., USA). Some were painted with an aqueous graphite dispersion (50 weight percent TIMREX® LB1016 in water) as shown in Table 3. Electrodes were cut from each sheet and tested on an AC impedance test, at open circuit potential, with a peak to peak potential amplitude of 10 mV, over a frequency range from 100 KHz to 0.1 Hz. The average ohmic resistance (Re), charge transfer (Rct) and double layer capacitance (Cdl) for each are shown in Table 3.

TABLE 3

| Current Collector | Re (ohms) | Rct (ohms) | Cdl (µF) |
|---|---|---|---|
| EXMET ™ uncoated | 1.06 | 0.03 | 2568 |
| EXMET ™ coated | 0.64 | 0.07 | 2660 |
| Screen coated | 0.71 | 0.07 | 1337 |

Example 11

Two nano-catalyst mixes were made with nano-MnO$_x$ as described in Example 4 except for the amounts of activated carbon, nano-catalyst and binder used. The quantities used and the compositions of the catalytic layers of the resultant dried electrodes are summarized in Table 4. Two catalytic electrodes were made with each of the mixes as described in Example 4 except the material used for the current collectors was 4Ni5-060 EXMET™, the current collectors were coated with TIMREX® LB1016 graphite dispersion as described in Example 10, and a silk cloth interleaf material was not used in laminating the PTFE membrane to the catalytic sheet for one of the electrodes made with each mix.

TABLE 4

| | Mix A | Mix B |
|---|---|---|
| Mix Ingredients (grams) | | |
| Activated Carbon | 205.8 | 205.9 |
| Nano-Manganese | 5.3 | 7.1 |
| PTFE Dispersion | 26.5 | 118.4 |
| Dry Composition (wt %) | | |
| Activated Carbon | 90.5 | 72.5 |
| Nano-Manganese | 2.5 | 2.5 |
| PTFE | 7.0 | 25.0 |

Each of the four lots of electrodes made was tested on the Half Cell AC Impedance/Potential Scan Test described in Example 6. Results of the potential dynamic scan portion of the test are summarized in Table 5.

TABLE 5

| Parameter | Units | Mix A | | Mix B | |
| --- | --- | --- | --- | --- | --- |
| | | No Interleaf | Silk Interleaf | No Interleaf | Silk Interleaf |
| CCV at 10 mA | volts | 1.380 | 1.380 | 1.359 | 1.377 |
| CCV at 100 mA | volts | 1.202 | 1.265 | 1.178 | 1.258 |
| Maximum Power | mW/cm$^2$ | 202 | 318 | 134 | 288 |

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A process for making a catalytic electrode for an electrochemical cell, comprising the steps:
   (a) mixing a catalytic material for oxidizing or reducing an active material with an electrically conductive material and a binder;
   (b) forming the mixture from step (a) into an active layer sheet having a first surface and a second surface opposite the first surface;
   (c) disposing a gas diffusion layer sheet having a first surface and a second surface opposite the first surface adjacent to the active layer sheet, with the first surface of the gas diffusion layer sheet against the first surface of the active layer sheet;
   (d) forming a bonded sheet by applying pressure to the second surface of the gas diffusion layer sheet via a textured roller or removable interleaf sheet having a woven pattern to bond the gas diffusion layer sheet to the active layer sheet with a pattern of relatively high adhesion areas and relatively low adhesion areas corresponding to the woven pattern of the textured roller or interleaf sheet; wherein the relatively high adhesion areas have lower gas permeability than the relatively low adhesion areas;
   (e) forming the bonded sheet into an electrode.

2. The process according to claim 1, wherein the pressure in step (d) is applied via a textured interleaf sheet that is removed after forming the bonded sheet.

3. The process according to claim 2, wherein the textured interleaf sheet comprises woven threads, fibers, filaments, hairs, or wires.

4. The process according to claim 3, wherein the interleaf sheet comprises a woven silk fabric.

5. The process according to claim 1, wherein the pressure in step (d) is applied via a textured roller with a woven pattern having raised portions 0.03 to 0.1 mm wide, separated by areas 0.15 to 0.25 mm wide.

6. The process according to claim 1, wherein the pressure is applied by a combination of plates, platens or rollers.

7. The process according to claim 1, wherein the adhesion of the gas diffusion area to the active layer is characterized by an overall bond strength of from 65 grams per 25.4 mm to 250 grams per 25.4 mm and the catalytic.

8. The process according to claim 1, wherein the gas diffusion layer sheet comprises a hydrophobic material.

9. The process according to claim 8, wherein the hydrophobic material comprises a fluorinated polymer.

10. The process according to claim 9, wherein the gas diffusion layer sheet comprises a polytetrafluoroethylene sheet.

11. The process according to claim 10, wherein the polytetrafluoroethylene sheet, prior to bonding the gas diffusion layer sheet to the active layer sheet, has an air permeability value of from 1 to 300 seconds and an apparent density of 1.5 to 1.7 g/cm$^2$.

12. The process according to claim 1, wherein the process further comprises the step of incorporating an electrically conductive current collector.

13. The process according to claim 12, wherein the current collector is made from an expanded metal comprising nickel and has a coating comprising graphite.

14. The process according to claim 12, wherein the current collector is embedded into the second surface of the active layer sheet.

15. A process for making an electrochemical cell comprising the steps:
   (a) providing a catalytic electrode made according to the process according to claim 1;
   (b) assembling the catalytic electrode with a counter electrode, an electrolyte and a separator, with the separator disposed between the catalytic electrode and the counter electrode, into a housing comprising an anode casing and a cathode casing; and
   (c) sealing the cell.

16. The process according to claim 15, wherein the cell is a metal-air battery cell.

17. The process according to claim 16, wherein the counter electrode comprises zinc and the electrolyte comprises an aqueous alkaline electrolyte.

18. The process according to claim 15, wherein the catalytic material comprises a manganese oxide.

* * * * *